No. 671,288. Patented Apr. 2, 1901.
J. MACPHAIL.
SECURING MEANS FOR SPRING RAKE TEETH.
(Application filed Nov. 26, 1900.)
(No Model.)
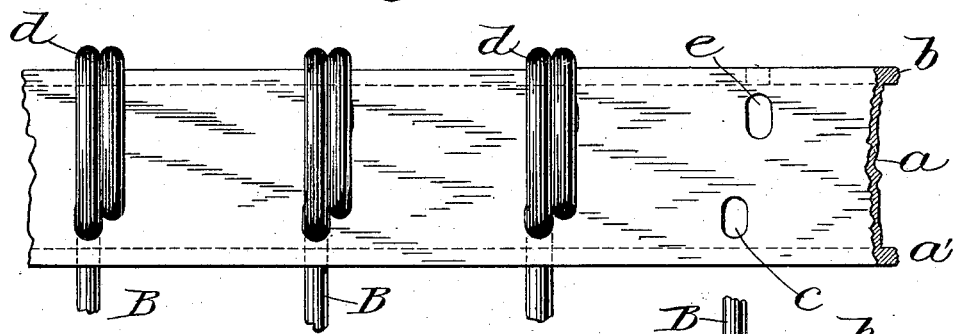
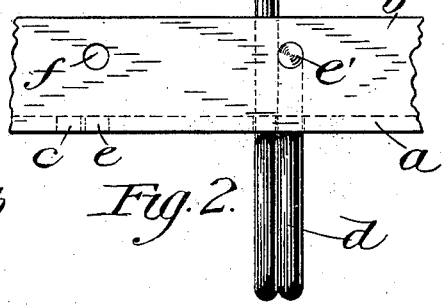
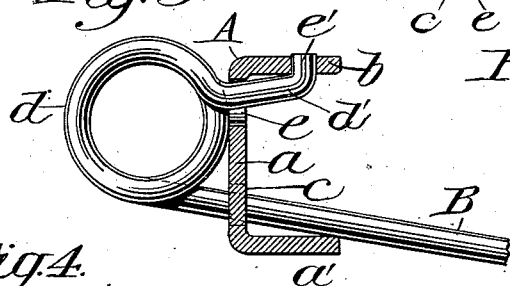
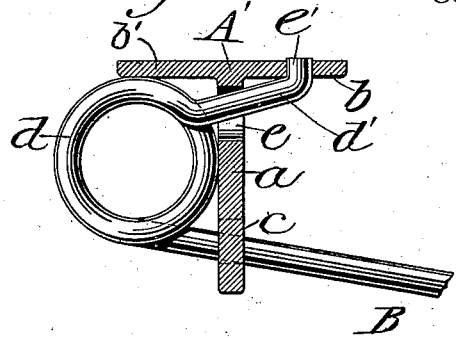
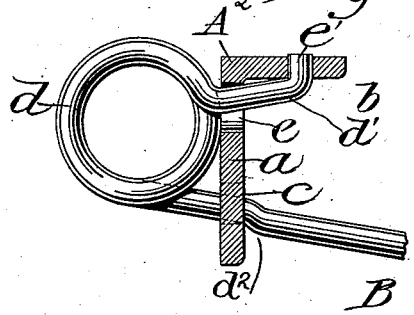
Witnesses: Inventor:

UNITED STATES PATENT OFFICE.

JAMES MACPHAIL, OF BLUE ISLAND, ILLINOIS.

SECURING MEANS FOR SPRING RAKE-TEETH.

SPECIFICATION forming part of Letters Patent No. 671,288, dated April 2, 1901.

Application filed November 26, 1900. Serial No. 37,806. (No model.)

*To all whom it may concern:*

Be it known that I, JAMES MACPHAIL, a citizen of the United States, residing at Blue Island, in the county of Cook and State of Illinois, have invented certain new and useful Improvements in Securing Means for Spring Rake-Teeth; and I do hereby declare the following to be a full, clear, and exact description of the invention, such as will enable others skilled in the art to which it appertains to make and use the same, reference being had to the accompanying drawings, forming a part of this specification.

My invention relates to the manner of securing spring-teeth to a head, support, or tooth-holder in the form of a channel, angle, or the like, and has for its object the doing away with nuts, bolts, clips, &c., that have heretofore been used to hold the teeth in place and making the teeth self-locking to the head or tooth-holder.

In the drawings, Figure 1 is a front elevation of a portion of a length of a head or tooth-holder, showing the teeth constructed and fastened in accordance with my invention. Fig. 2 is a plan view of the same; and Figs. 3, 4, and 5 are vertical cross-sections of different forms of heads or tooth-holders, showing the manner of attaching a tooth to each.

Referring to the views, A, A', and $A^2$ represent various cross-sections of the head or tooth-holder. It is of a length appropriate to the width of the implement in which the tooth is to be used. The simplest and preferable embodiment of my invention is shown in Fig. 3, in which the head or tooth-holder is formed of a channel. In the said channel $a$ is the vertical member, and $a'$ and $b$ are the horizontal members. In Fig. 4 the head or tooth-holder is denoted by A'. It is here formed of a T-iron, in which $a$ is the vertical member, and $b$ and $b'$ are respectively the rearward and forward extensions of the horizontal member, and in Fig. 5 it is denoted by $A^2$ and is shown formed of an angle-iron, in which $a$ is the vertical member and $b$ the horizontal member. The special features of these latter adaptations will be referred to and described later on. The tooth B is preferably made of round wire. At its upper end it is wound into a coil $d$, and the end of the wire beyond the coil is bent outwardly therefrom and in such a manner that when pressed into position in the tooth-holder it will lie in a general horizontal direction, extending lengthwise of the working shank of the tooth, as at $d'$. The free end of this outward extension $d'$ is bent substantially at right angles thereto and away from the working shank of the tooth, forming a locking-detent $e'$, as plainly illustrated in the drawings. The working shank or main portion of the tooth is bent or shaped into a form most suitable for the purpose to which it is to be adapted.

Near its lower edge the vertical member $a$ of the head or tooth-holder in all the forms is provided with a series of slots or holes $c$ at appropriate intervals along its length, and a similar series of holes or slots $e$ near its upper edge, bearing such relation to the hole $c$ as determined by the number and size of the coils in the tooth. The horizontal member $b$ is also provided with a corresponding series of holes $f$, preferably in line with the holes or slots $e$.

When the tooth is in position, the coil $d$ lies immediately in front of and against the vertical member $a$, the working shank lies in the slot or hole $e$, the outward extension $d'$ in the slot or hole $e$, and the locking-detent $e'$ in the hole $f$ of the tooth-holder. The construction is such that the resilience of the coil holds the locking-detent $e'$ securely in the hole $f$. The locking-detent $e'$ holds the coil snugly against the vertical member $a$, which prevents the tooth from being drawn through the slot or hole $c$. The outward extension $d'$ is of such length that the tooth is held rigidly against lateral movement and strains. The horizontal members $a'$ and $b'$ of the form shown in Figs. 3 and 4 prevent the tendency of the tooth to revolve about a point at the bottom of the slot or hole $c$ and to disengage the locking-detent $e'$. The sharp offset bend $d^2$ in the working shank of the tooth (shown in Fig. 5) serves the above-mentioned purpose of the horizontal member $a'$—namely, that of preventing a tendency to turn and unlock the tooth in its hole.

Having thus described the construction of my invention, the manner of inserting the teeth and securing them in the head or tooth-holder will be readily understood from the drawings. The working shank of the tooth is inserted into the slot or hole c, and the outward extension d' of the coil d is brought into line and inserted in the slot or hole e by bringing a slight torsion on the coil. The locking-detent is then inserted in the hole f and is maintained there by the resilience of the coil-spring. The tooth is thus securely held in place without the use of nuts, bolts, or clips, still allowing the working shank to move, as its work may require, in the slot or hole c the desired amount against the resilience of the coil.

Having thus described my invention, what I claim as new, and desire to secure by Letters Patent, is—

1. The combination with a tooth comprising a working shank, a resilient portion, and a locking extension, of a head or tooth-holder having the member a provided with the holes or slots c and e, through which the working shank and the locking extension respectively project, and the member b, the locking extension having the detent e' to engage the member b, all combined substantially as described.

2. The combination with an elastic tooth comprising a working shank, a coil, and a locking extension, of a head or tooth-holder having the member a provided with the holes or slots c and e, through which the working shank and the locking extension respectively project, and the member b, the locking extension having the detent e' to engage the member b, all combined substantially as described.

3. The combination with an elastic tooth comprising a working shank, a coil, and a locking extension, of a head or tooth-holder having the member a through which the working shank and the locking extension project in holes or slots provided therefor, and the member b, the locking extension having a detent, which latter is held in engagement with the member b by the resilience of the coil, substantially as described.

4. The combination with an elastic tooth comprising a working shank, a coil formed near one end, and a locking extension projecting outwardly from the coil, of a head or tooth-holder having the member a against which the coil rests and through which the working shank and the locking extension project in holes or slots provided therefor, a horizontal member to hold the tooth from turning in the vertical member, and the member b, the locking extension having a detent which is held in engagement with the member b by the resilience of the coil, substantially as described.

5. The combination with an elastic tooth comprising a working shank, a coil formed near one end, and a locking extension projecting outwardly from the coil and, when in position in the head, substantially parallel with the portion of the working shank nearest the coil, provided with a detent, of a head or tooth-holder formed of a channel angle or like iron having the member a against which the coil rests and through which the working shank and the locking extension project in holes or slots provided therefor, a horizontal member to hold the tooth from turning in the vertical member, and the member b having a hole adapted to receive the locking-detent, which is held in engagement therewith by the resilience of the coil, substantially as described.

In testimony whereof I affix my signature in the presence of two witnesses.

JAS. MACPHAIL.

Witnesses:
CHAS. H. CHAMBERS,
J. H. PITKIN.